(12) United States Patent
Ladoucer et al.

(10) Patent No.: US 7,427,180 B2
(45) Date of Patent: Sep. 23, 2008

(54) SELF-ATTACHING FASTENER SYSTEMS

(75) Inventors: Harold A. Ladoucer, Livonia, MI (US); John J. Vrana, Rochester Hills, MI (US)

(73) Assignee: Whitesell International Corporation, Taylor, MI (US)

( * ) Notice: Subject to any disclaimer, the term of this patent is extended or adjusted under 35 U.S.C. 154(b) by 461 days.

(21) Appl. No.: 10/486,679

(22) PCT Filed: Jul. 31, 2002

(86) PCT No.: PCT/US02/24174

§ 371 (c)(1),
(2), (4) Date: Jul. 9, 2004

(87) PCT Pub. No.: WO03/016727

PCT Pub. Date: Feb. 27, 2003

(65) Prior Publication Data

US 2005/0013679 A1 Jan. 20, 2005

(51) Int. Cl.
 *F16B 37/04* (2006.01)
(52) U.S. Cl. ..................................... 411/181
(58) Field of Classification Search ............. 411/85, 411/175, 176, 179–181, 187; 29/525, 525.11
See application file for complete search history.

(56) References Cited

U.S. PATENT DOCUMENTS

| | | | |
|---|---|---|---|
| 833,187 A | 10/1906 | Ward | |
| 1,769,263 A | 7/1930 | Johnson | |
| 2,149,902 A | 3/1939 | Saurer | |
| 2,221,961 A | 11/1940 | Allen et al. | |
| 2,387,983 A | 10/1945 | Dickenson | |
| 3,083,429 A | 4/1963 | Barlow | |
| 3,140,010 A | 7/1964 | Double | |
| 3,299,500 A * | 1/1967 | Double | 29/432.2 |
| 3,648,747 A * | 3/1972 | Steward | 411/179 |
| 3,704,507 A | 12/1972 | Grube | |
| 3,711,931 A | 1/1973 | Ladouceur et al. | |
| 3,722,670 A | 3/1973 | Plunkett | |
| 3,724,520 A * | 4/1973 | Ladouceur et al. | 411/179 |
| 3,736,969 A * | 6/1973 | Warn et al. | 411/179 |
| 3,775,791 A | 12/1973 | Grube | |
| 3,810,291 A * | 5/1974 | Ladouceur | 29/243.517 |
| 3,845,860 A | 11/1974 | Ladouceur et al. | |
| 3,851,759 A | 12/1974 | Young et al. | |
| 3,926,236 A * | 12/1975 | Pouch et al. | 411/179 |
| 4,040,325 A | 8/1977 | Monacelli | |
| 4,124,050 A | 11/1978 | Ackerman | |
| 4,296,533 A | 10/1981 | Doerter | |

(Continued)

FOREIGN PATENT DOCUMENTS

EP  0893204  1/1999

*Primary Examiner*—Flemming Saether

(57) ABSTRACT

Methods of forming and feeding self-attaching fasteners are disclosed wherein the strip includes a plurality of spaced abutment surfaces, preferably notches, which may be used both during the manufacturing process and feeding of a strip of fasteners to an installation head. Where the fasteners are interconnected in a strip, by frangible wires, the wires are located in the bottom wall of the panel receiving grooves in the flange portions on opposed sides of the projecting pilot portion. A self-attaching fastener having deformable inclined lip portions which extend upwardly and toward the pilot portion from the flange portions which are deformed during installation to provide further securement for the panel when deformed in the grooves.

4 Claims, 7 Drawing Sheets

U.S. PATENT DOCUMENTS

| | | | |
|---|---|---|---|
| 4,306,654 A | | 12/1981 | Grube |
| 4,430,033 A | * | 2/1984 | McKewan .................... 411/61 |
| 4,451,245 A | * | 5/1984 | Hornig et al. ............... 464/181 |
| 4,555,838 A | * | 12/1985 | Muller ...................... 29/432.1 |
| 4,633,560 A | * | 1/1987 | Muller ......................... 29/798 |
| 4,690,599 A | * | 9/1987 | Shinjo ........................ 411/180 |
| 4,914,815 A | | 4/1990 | Takada et al. |
| 4,915,558 A | * | 4/1990 | Muller ........................ 411/179 |
| 4,971,499 A | * | 11/1990 | Ladouceur ................. 411/179 |
| 5,092,724 A | * | 3/1992 | Muller ........................ 411/179 |
| 5,246,323 A | * | 9/1993 | Vernet et al. .................. 411/29 |
| 5,340,251 A | * | 8/1994 | Takahashi et al. ........... 411/179 |
| 5,502,888 A | * | 4/1996 | Takahashi et al. ............. 29/798 |
| 5,528,812 A | * | 6/1996 | Muller ...................... 29/432.2 |
| 5,531,552 A | * | 7/1996 | Takahashi et al. ........... 411/179 |
| 5,549,430 A | * | 8/1996 | Takahashi et al. ........... 411/179 |
| 5,613,815 A | * | 3/1997 | Muller ........................ 411/181 |
| RE35,619 E | * | 10/1997 | Muller ......................... 29/716 |
| 5,740,651 A | * | 4/1998 | Vanotti ........................ 52/698 |
| 5,878,880 A | | 3/1999 | Poffenberger |
| 5,913,421 A | | 6/1999 | Shinjo |
| 5,927,491 A | | 7/1999 | Room et al. |
| 6,116,835 A | | 9/2000 | Blacket et al. |
| 6,125,524 A | * | 10/2000 | Mueller ........................ 29/520 |
| 6,183,474 B1 | * | 2/2001 | Bramlet et al. ................. 606/66 |
| 6,257,814 B1 | * | 7/2001 | Muller ........................ 411/176 |
| 6,276,040 B1 | * | 8/2001 | Muller ...................... 29/432.2 |
| 6,409,444 B2 | * | 6/2002 | Pamer et al. ................. 411/180 |
| 6,604,900 B2 | * | 8/2003 | Ikami et al. .................. 411/181 |
| 6,851,904 B2 | * | 2/2005 | Parker et al. ................. 411/180 |
| 7,001,125 B2 | * | 2/2006 | Wojciechowski et al. ... 411/180 |
| 2004/0042871 A1 | * | 3/2004 | Wojciechowski et al. ... 411/181 |
| 2004/0042872 A1 | * | 3/2004 | Ward et al. ................... 411/181 |
| 2004/0076489 A1 | * | 4/2004 | Ladouceur ................... 411/181 |
| 2004/0086355 A1 | * | 5/2004 | Couillais et al. ............. 411/181 |
| 2004/0146376 A1 | * | 7/2004 | Ward et al. ................... 411/181 |
| 2004/0202524 A1 | * | 10/2004 | Ross et al. ................... 411/181 |
| 2004/0234356 A1 | * | 11/2004 | Parker et al. ................. 411/181 |
| 2005/0013679 A1 | * | 1/2005 | Ladoucer et al. ............ 411/180 |

* cited by examiner

SELF-ATTACHING FASTENER SYSTEMS

FIELD OF THE INVENTION

This invention relates to fastener systems, particularly self-attaching fastener systems, including pierce and clinch nuts having a central projecting pilot portion and flange portions on at least opposed sides of the pilot portion. More specifically, this invention relates to a method of forming self-attaching fasteners, a strip of preoriented self-attaching fasteners and methods of forming and feeding self-attaching fasteners to an installation head and fastener and panel assemblies.

BACKGROUND OF THE INVENTION

Self-attaching fastener systems developed by the predecessor in interest of the applicant (Multifastener Corporation) have been used for many years in mass production applications, including the automotive industry. Such fasteners generally include a central projecting pilot portion having a threaded or unthreaded bore therethrough and flange portions on opposed sides of the pilot portion. Universal™ pierce and clinch nuts commercially available from the assignee of this application include a groove extending into opposed sides of the projecting pilot portion adjacent the flange portions. When used as a clinch nut, the pilot portion is received through an opening in a panel and the panel is then received on panel supporting or engaging surfaces of the flange portions. The panel is then deformed by a die button into the grooves in the pilot portion, permanently attaching the fastener to the panel. When used as a pierce nut, the end of the pilot portion is used as a punch, piercing an opening in the panel, which receives the pilot portion as described.

In the Hi-Stress™ nut, also commercially available from the Assignee of the present application, the panel receiving grooves are located in the flange portions on opposed sides of the pilot portion. In the preferred embodiment of the Hi-Stress™ nut, the grooves are dovetail-shaped having a restricted opening at the panel receiving surface of the flange portions providing significantly improved pull-off strength. When used as a pierce nut, the pilot portion pierces an opening in the panel and the panel adjacent the opening is then deformed by a die member into the dovetail-shaped grooves and against the bottom wall of the grooves providing improved push-off strength. Both types of pierce and clinch nuts described above are generally installed in mass production applications by a die press. One platen of the die press includes an installation head which receives the pierce or clinch nuts and the opposed die platen includes a die button which deforms the metal into the grooves of the nut as described above. U.S. Pat. No. 3,140,010, describes a method and apparatus for dispensing fasteners of the type described above which includes adhesively fixing the fasteners to a continuous web.

The prior patents describe a number of methods of preorienting fasteners in a carrier strip, including an integral frangible carrier portion or methods of attaching fasteners on a wire or plurality of wires. U.S. Pat. No. 3,711,931, assigned to the predecessor in interest of the applicant, describes a method of forming a continuous strip of preoriented self-attaching fasteners including pierce and clinch nuts of the type described above, wherein wire grooves are formed on the back bearing surface of the nut opposite the pilot portion. The pierce or clinch nuts are then oriented in end to end relation with the wire grooves coaxially aligned and a frangible continuous wire is then inserted or rolled into the wire grooves and the back face of the fastener is deformed over the wires by a knurling tool. Self-attaching fasteners of the type described above are now supplied by the assignee of this application in bulk and strip form as disclosed in the above referenced U.S. Pat. No. 3,711,931.

The self-attaching fasteners described above are fed to the installation head by a reciprocal pawl having a finger received in the threaded bore. In a typical installation, the installation head includes a chuck or feeder which, upon opening of the die press, feeds a nut into the plunger passage of the installation head, such that a nut is located in the "ready position" following each stroke of the press.

Self-attaching fasteners of the type described above are presently formed by a rolling process, starting with a continuous metal wire, wherein the desired cross-section of the fastener is first formed in a continuous strip of metal, which is then rolled into a coil. The coil is then fed through a punch, which punches or pierces the nut bore, and the strip is then fed to a cut-off tool which cuts the strip into discreet fasteners each having a projecting pilot portion and flange portions on opposed sides of the pilot portion. One problem with this method of forming self-attaching fasteners, particularly in mass production applications, is that the bore may not be accurately centered in the pilot portion because the exact position of the strip is difficult to control. At present, the strip is positioned opposite the punch by moving the strip until it contacts a stop. However, the strip may not fully engage the stop or bounce off the stop. This is a particular problem in mass production applications because only two bores are punched at a time and therefore the strip must be repeatedly located opposite the punches. As will be understood, the bore of a nut must be accurately located in the pilot for proper function.

There are several problems associated with the present method of forming a preoriented fastener strip as disclosed in the above referenced U.S. Pat. No. 3,711,931, and the feeder system described above. The method of installing a self-attaching fastener of the type described above is disclosed in U.S. Pat. No. 3,648,747 assigned to the predecessor-in-interest of the assignee of this application. First, location of the wires on the rear bearing face of the pierce or clinch nut reduces the bearing area for the punch which installs the fastener in a panel. During installation of a fastener strip of the type described in the above referenced U.S. Pat. No. 3,711,931, the reciprocating punch of the installation head engages and drives the rear face of the fastener into the panel or panel opening. It would therefore be desirable to eliminate the wire grooves and wires from the rear face of the fastener to increase the bearing area. It should also be understood that following installation of the pierce or clinch nut to a panel, a second panel, such as a bracket or other component, is secured to the panel which receives the self-attaching fastener. It would thus be desirable to increase the bearing area of the self-attaching fastener by eliminating the wire grooves.

Another problem associated with forming a preoriented strip of fasteners as disclosed in the above referenced patent is that the frangible wires interconnecting the self-attaching fasteners may be pulled out of the wire grooves during installation of the fastener in a panel, creating a sharp wire end on the rear surface of the fastener. Further, the adjacent surfaces of the fasteners in the preoriented strip are spaced a predetermined distance for installation. Thus, when the frangible wires are severed during the installation process, these sharp wire ends protrude from the wire grooves adjacent the rear bearing surface of the fastener following installation which also creates a potential handling hazard. Another problem with the method of attaching the self-attaching fasteners in a preoriented fastener strip as disclosed in the above referenced patent is movement of the nuts on the wires prior to and during feeding of the nuts to the installation head which may cause misfeeding. Finally, another problem with the present method of feeding self-attaching nuts to an installation head is damage to the thread cylinder of the threaded bore through the pilot portion. As set forth above, self-attaching fasteners are normally fed to the installation head by a feed pawl having a finger received in the threaded bore. The feed pawl may damage the thread cylinder.

SUMMARY OF THE INVENTION

The preoriented strip of self-attaching fasteners of this invention for attachment to a panel, method of forming self-attaching fasteners, method of forming a strip of self-attaching fasteners and method of feeding a strip of fasteners to an installation head of this invention solve the above problems associated with the prior art without additional expense. As set forth above, the self-attaching fasteners of this invention preferably includes a projecting pilot portion adapted to be received through an opening in a panel, and a flange portion adjacent the pilot portion having a panel receiving or bearing surface. In the continuous preoriented strip of self-attaching fasteners of this invention, however, the wire groove is formed in the panel receiving surface adjacent the pilot portion, such that upon installation of the fastener to a panel, the panel overlies the wire groove and the wire. This method of installation thus eliminates the problems associated with sharp wire ends or tangs because the wire ends are completely covered by the panel following installation. The preferred method of forming a preoriented strip of self-attaching fasteners of this invention thus includes forming a wire groove in the panel receiving surface of the flange portion of the self-attaching fastener and inserting a continuous frangible wire in the wire groove, interconnecting the fasteners in a continuous preoriented strip. The preferred embodiments of self-attaching fasteners, as described above, include a flange portion on opposed sides of the projecting pilot portion. In such embodiments, the fastener strip preferably includes a wire groove in the panel receiving surface on opposed sides of the pilot portion and parallel continuous frangible wires are received in the wire grooves and secured to the fasteners. The method further includes preorienting or aligning the fasteners, such that the wire grooves are coaxially aligned and the continuous frangible wires are preferably installed in the grooves by rolling.

The self-attaching fasteners of this invention and method of forming same may be used with various embodiments of fasteners, including both the Universal™ fastener systems and the HI-Stress™ fastener systems described above and other self-attaching fastener systems. In the Hi-Stress™ fastener system, the method includes first forming a panel receiving groove in the flange portions adjacent the pilot portion, preferably on both sides of the pilot portion. The method then includes forming a wire groove in the lower surface or bottom wall of the panel receiving groove, preferably both grooves, and then inserting a continuous frangible wire in the wire grooves through the panel receiving grooves and securing the wires to the fasteners.

In the most preferred embodiment of this invention, the bottom wall of the wire groove or grooves includes a plurality of spaced pockets. As used herein, the term "pockets" may include either depressions or upstanding ribs, defining pockets therebetween. The continuous frangible wire is then deformed against the bottom wall of the wire groove, filling the pockets, and preventing movement of the fasteners on the wires.

The method of feeding a preoriented strip of fasteners to an installation head and preoriented fastener strip of this invention also eliminates damage to the thread cylinder. The method of forming a preoriented strip of fasteners of this invention includes forming a plurality of discreet self-attaching fasteners, preferably of the type described above, wherein each of the fasteners includes a projecting pilot portion, a flange portion on opposed sides of the pilot portion having a panel receiving surface adjacent the pilot portion and side surfaces. The method then includes forming a plurality of preferably equally spaced abutment surfaces on at least one of the sides of each of the fasteners, orienting the fasteners in end to end relation, preferably in nearly abutting relation, and then interconnecting the fasteners by a frangible connector element forming a preoriented strip of fasteners having abutment surfaces on at least one side of the preoriented fastener strip. The preoriented fastener strip is then fed to an installation head by receiving a driving member seriatim in the spaced abutment surfaces and moving the driving member to drive the strip of preoriented fasteners to the installation head. In the preferred embodiment, the abutment surfaces are equally spaced notches or grooves in the side wall of the fasteners. This method thus eliminates contact of the driving member with the bore of the fasteners.

Another advantage of the method of forming and feeding a preoriented strip of fasteners of this invention is that the abutment surfaces may be formed in the rolled metal strip from which the fasteners are formed and used to accurately locate the nut bore in the fasteners formed from the strip. This method includes forming a continuous metal strip having the cross-section of the self-attaching fasteners to be formed including a continuous central projecting pilot portion and flange portions on opposed sides of the pilot portion, wherein the flange portions include a bearing face spaced below the end face of the pilot portion and side faces. The method of forming self-attaching female fasteners of this invention then includes forming a plurality of equally spaced notches in at least one side face of the continuous strip, locating the continuous strip opposite a cylindrical punch by receiving a locating member in one of the notches and moving the punch to punch a cylindrical bore in the strip, then moving the strip to successively receive the locating member in a second notch in the strip opposite the punch to punch a plurality of equally spaced cylindrical bores in the strip and finally locating the strip opposite a cut-off tool by receiving a locating member in a notch in the strip and then moving the cut-off tool to at least partially severe the self-attaching female fasteners from the strip, preferably completely severing the strip to form discreet fasteners. This method assures that the nut bore is accurately located through the pilot portion of each nut, eliminating a problem with the present method of forming self-attaching female fasteners. In the preferred method, the fasteners are completely severed from the strip and the fasteners are then interconnected by frangible connectors as described above.

In the preferred embodiments of the method of forming self-attaching fasteners or a preoriented strip of fasteners and method of feeding a preoriented strip of fasteners of this invention, the abutment surfaces are defined by substantially equally spaced notches or grooves in the side wall of the continuous metal strip from which the fasteners are formed or the preoriented strip which is fed to the installation head, the method includes receiving a drive member seriatim in the spaced notches and moving the drive member to drive the strip, thus eliminating contact between the drive member and the thread cylinder of the fasteners. In one embodiment, each of the fasteners in the strip includes a plurality of equally spaced grooves or notches. In another embodiment, the notches are formed between adjacent fasteners by chamfering the adjacent ends of the fasteners. In one embodiment, the drive member is a rotatable wheel having a plurality of radial spokes which are received in the notches in the fastener strip, such that rotating the drive member drives the fastener strip. In another embodiment, the drive member is a pawl having a finger configured to be received in the notches and the pawl is reciprocated to drive the fasteners or the fastener strip. As will be understood, however, the abutment surfaces can also be defined by protuberances or projections extending from the side walls of the nut strip.

Other advantages and meritorious features of the present invention will be more fully understood from the following description of the preferred embodiments, the appended claims and the drawings, a brief description of which follows.

DETAILED DESCRIPTION OF A PREFERRED EMBODIMENT

Figure 1:
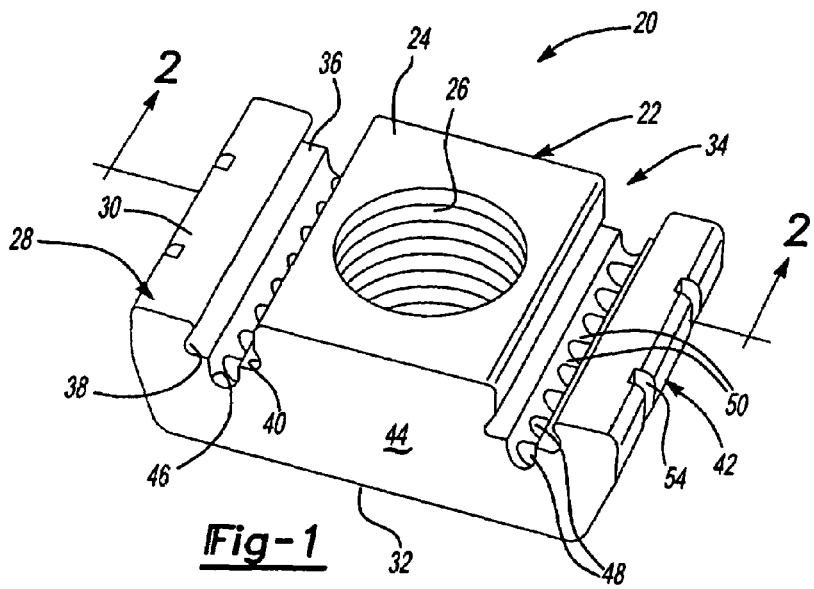
FIG. 1 is a side elevation of one embodiment of a self-attaching fastener of this invention.
Figures 2, 3:
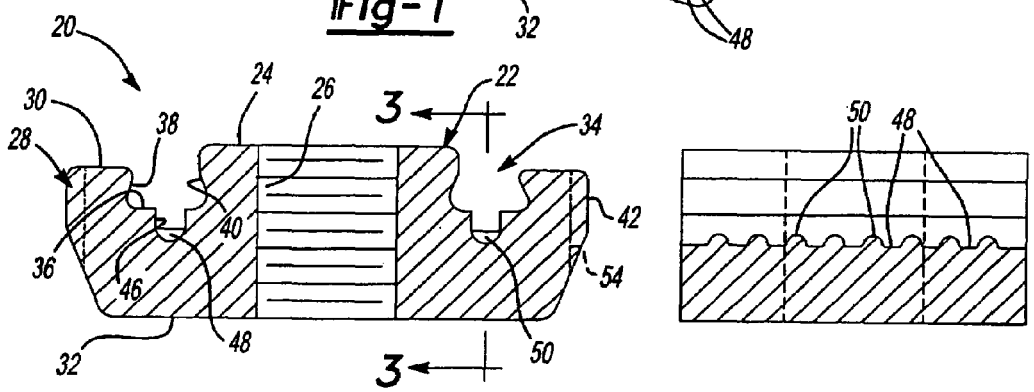
FIG. 2 is a side cross-sectional view of FIG. 1 in the direction of view arrows 2-2.
FIG. 3 is an end cross-sectional view of FIG. 2 in the direction of view arrows 3-3.
Figures 5, 6:
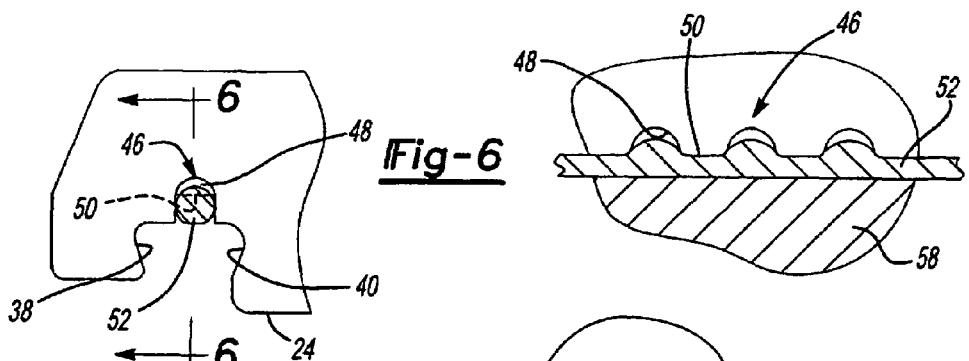
FIG. 5 is a partial side view of the self-attaching fastener illustrated in the previous figures with a frangible wire located in the wire groove.
FIG. 6 is a partial end cross-sectional view of FIG. 5 in the direction of view arrows 6-6.

As set forth above, the present invention relates to fastener systems, particularly but not exclusively self-attaching fastener systems, including preoriented self-clinching and self-piercing and clinching nuts suitable for mass production applications, wherein the fastener is permanently installed in a metal panel. FIGS. 1 to 3 illustrate one preferred embodiment of a self-attaching fastener 20 of this invention. The self-attaching fastener 20 illustrated in FIGS. 1 to 3 may be rolled from steel bar stock as described in the above-referenced U.S. Pat. No. 3,711,931, the disclosure of which is incorporated herein by reference. Further, as described above, the self-attaching fastener illustrated in FIGS. 1 to 3 may be used either as a self-clinching fastener, wherein the panel to which it is attached includes an opening configured to receive the central pilot portion 22 or a piercing and clinching fastener, wherein the top face or piercing face 24 of the pilot portion pierces an opening in the panel and the fastener 20 is then clinched to the panel as described further below and in the above-referenced U.S. Pat. No. 3,648,747.

In the disclosed embodiment, the pilot portion 22 includes a bore 26 extending perpendicular to the top face 24 which may be threaded as shown. Alternatively, the bore 26 may be smooth and a thread forming or thread rolling male fastener element (not shown) may be threaded into the bore 26 to attach a second element to the fastener and panel assembly. A self-attaching fastener of the type disclosed herein generally also includes flange portions 28 on opposed sides of the central pilot portion 22 which receive and support the panel following installation.

In the disclosed embodiment of the self-attaching fastener 20, the fastener includes parallel panel receiving grooves 34 which extend into the bearing faces 30 of the flange portions 28 as best shown in FIGS. 1 and 2. Alternatively, as described in the above-referenced U.S. Pat. No. 3,711,931, the panel receiving grooves may be defined in the side faces of the pilot portion. In the disclosed embodiment, the panel receiving grooves include a bottom wall or surface 36 and inclined side walls 38 and 40 defining re-entrant dovetail-shaped grooves having a smaller opening adjacent the bearing faces 30 than at the bottom wall 36 improving the push-off force required to remove the fastener from the panel following installation. Alternatively, the inner wall 40 may extend perpendicular to the end face 24 of the pilot portion as disclosed below in regard to FIGS. 14 to 16. The fastener further includes side walls 42 which may be tapered from the bottom bearing face 32, as shown, to reduce the volume of metal required for forming the fastener. The end faces 44 of the fastener are generally perpendicular to the piercing face 24 because the end faces 44 are formed by cutting or chopping a rolled section as disclosed in the above-referenced U.S. Pat. No. 3,711,931 and shown in FIGS. 21 and 22.

As described above in the Background of the Invention and shown in the above-referenced U.S. Pat. No. 3,711,931, self-attaching fasteners are presently interconnected in a preoriented fastener strip for installation by an installation apparatus or head by forming wire receiving grooves in the bottom bearing surface 32 and the fasteners are interconnected by frangible metal wires which are rolled into the wire grooves and staked. This method of interconnecting self-attaching fasteners creates several problems as described above, including sharp wire tangs extending from the bearing face 32 following installation, reduced bearing area during installation and movement of the fasteners on the wires during coiling and feeding of the fastener strip. Another problem associated with feeding a fastener strip of this type is that the finger of the feed pawl is received in the bore 26 which may damage the thread cylinder whether the bore 26 is threaded or not. These problems associated with self-attaching fastener systems are solved by the embodiments of the fastener system and methods of this invention as now described below.

In the disclosed embodiments of the self-attaching fastener, the wire grooves 46 extend into the bearing face 36 of the flange portion 28. Where the self-attaching fastener 20 includes panel receiving grooves 34 as shown, the wire grooves 46 are preferably formed in the bottom wall or surface 36 of the panel receiving grooves. Alternatively, where the panel receiving groove is defined in the side walls of the central pilot portion 22 as disclosed in the above-referenced U.S. Pat. No. 3,711,931, the wire receiving grooves may be formed directly in the panel supporting surfaces or bearing faces 30 of the flange portions 28 of the fastener. In the preferred embodiments, the lower surfaces of the wire grooves 46 include a plurality of spaced pockets 48 spaced by upstanding ribs 50. Stated another way, the bottom surface of the wire receiving grooves have a plurality of upstanding ribs 50 as best shown in FIG. 3. As described below, the ribs or pockets prevent movement of the self-attaching fasteners on the wires 52 as described below. Further, in the preferred embodiments of the preoriented strip of self-attaching fasteners, the fastener strip includes a plurality of generally equally spaced grooves or notches for feeding the fastener strip, such as the notches 54 in the side walls of the fastener shown in FIGS. 1 and 2. As set forth further below, the terms "wire" or "wires" are not limited to a metal wire. Further, as described further below, a preoriented strip of self-attaching fasteners may also be formed by partially severing the pilot portion from the strip leaving frangible connector portions between the nuts in the strip.

Figure 7:
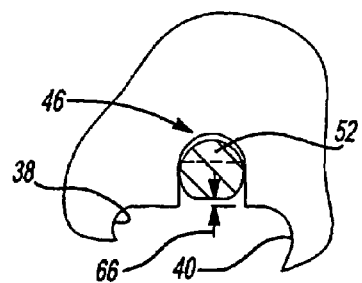
FIG. 7 is a partial side cross-sectional view similar to FIG. 5 with the wire located below the bottom surface of the panel groove.
Figure 4:
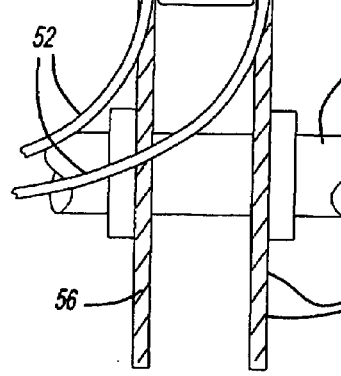
FIG. 4 is a side view illustrating the method of attaching frangible wires in the self-attaching fastener illustrated in FIGS. 1 to 3.
Figure 8:
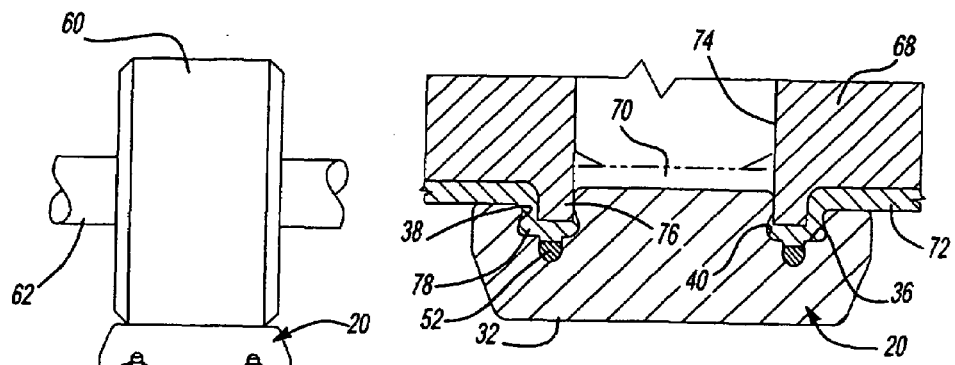
FIG. 8 is a side cross-sectional view of the self-attaching fastener as shown in the previous figures following installation of the fastener in a panel.

In the disclosed embodiment, the frangible wires interconnecting the self-attaching fasteners 20 are secured to the fasteners by knurling rollers 56 shown in FIG. 4. The knurling rollers 56 are mounted on a suitable shaft 58 and the knurling rollers include a plurality of radially spaced splines 59. The knurling rolls 56 preferably have a width equal to or smaller than the opening of the panel receiving groove 34, but preferably wider than the width of the wire receiving grooves 46. As shown schematically in FIG. 4, the self-attaching fasteners 20 are driven into engagement with the knurling rollers 56 by a roller 60 mounted on shaft 62. As shown in FIGS. 4, 5, 6 and 9, the knurling rollers 58 deform the wire into the pockets 48 in the lower surface of the wire receiving grooves 34, preventing movement of the fasteners 20 on the wires 52 following installation. The splined knurling rollers 58 further deform the bottom wall 36 of the panel receiving grooves 34, securing the wires 52 in the wire grooves 46 as shown by splined grooves 64 in FIG. 9. Alternatively, the rollers 58 with or without splines, may have a width generally equal to or slightly smaller than the width of the opening of the wire receiving grooves 46 to deform the wires 52 into the pockets 48 and below the surface of the bottom wall or surface 36 of the panel receiving grooves as shown by dimensional arrows 66 in FIG. 7. The panel 72 may then be partially deformed into the wire receiving grooves during installation of the fastener 20 to a panel as shown in FIG. 8.

Figure 11:
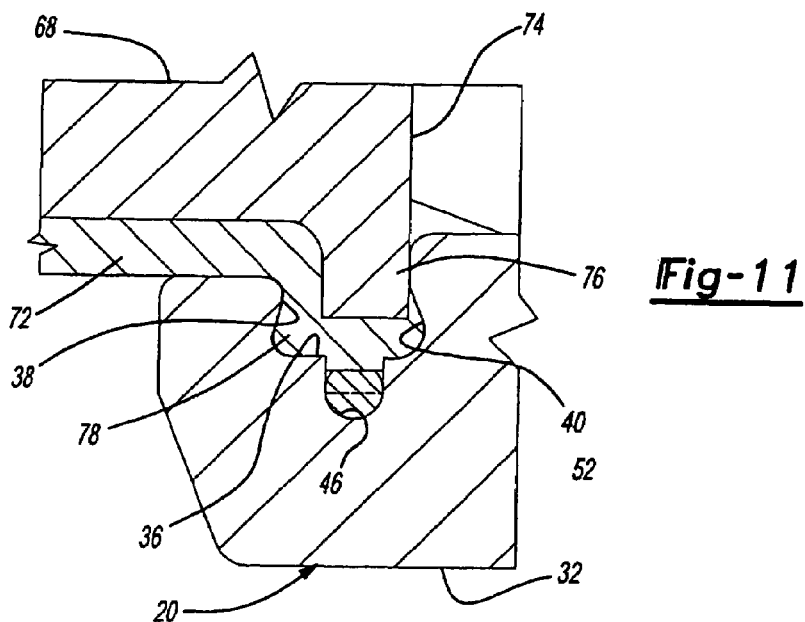
FIG. 11 is an enlarged partial side cross-sectional view of FIG. 8 illustrating a preferred embodiment of the installation of the panel in the panel groove.

As described in the above-referenced U.S. Pat. No. 3,648,747, self-attaching fasteners are normally installed in a panel by a die button 68 as shown in FIG. 8. The preoriented strip of self-attaching fasteners 20 is received in an installation head (not shown) having a reciprocating plunger which is driven against the rear bearing surface 32, fracturing the frangible connector elements and driving the fastener 20 against the panel 72 which is supported on a die button 68. Where the self-attaching fastener is used as a pierce nut, the piercing surface 24 simultaneously pierces a slug 70 from the panel 72 and clinches the panel to the fastener as shown in FIG. 8. The die button 68 includes a rectangular opening 74 which receives the panel slug 70 and parallel clinching lips 76 deform the panel portion 78 adjacent the pierced opening into the panel receiving grooves 34 and against the bottom wall 36. The deformation of the panel against the bottom wall 36 deforms the panel portion 78 beneath the inclined inner and outer side walls 38 and 40 of the panel receiving groove forming a very secure installation as shown in FIG. 8. Where the surface of the wires 52 are deformed below the bottom wall or surface 36 of the panel receiving grooves 34, as shown in FIG. 7, the panel portion 78 is also deformed into the wire grooves as shown in FIG. 11.

As will be understood by those skilled in this art, the wires 52 may be formed of various materials as disclosed in the above-referenced U.S. Pat. No. 3,711,931. The retaining wires 52 are preferably formed from a flexible material permitting the preoriented strip of fasteners to be rolled into a coil, but may be cut during installation of the fastener by the plunger of the installation head (not shown). Thus, the wires are preferably flexible, but frangible. A suitable material for the wires is annealed 1008 low carbon steel, which is not heat treated. This material provides more ductility and flexibility than music wire, for example, and does not dull the plunger as would music wire. Other suitable materials include monofilament nylon cord and cable and other suitable metals and polymers.

Figure 9:
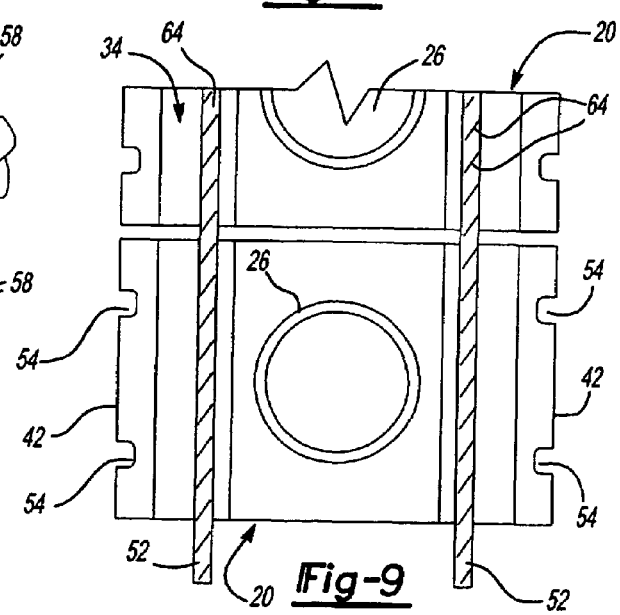
FIG. 9 is a top cross-sectional view of the self-attaching fasteners described above in a preoriented strip.
Figure 10:
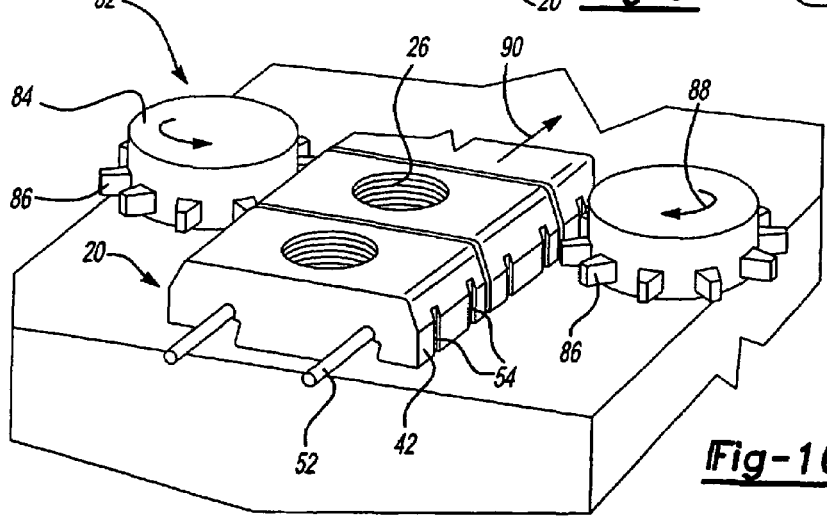
FIG. 10 is an elevation of the preoriented fastener strip of FIG. 9 and one preferred embodiment of a feed apparatus.

As set forth above, the preoriented fastener strip disclosed in the above-referenced U.S. Pat. No. 3,711,931 are conventionally fed to the installation head (not shown) by a reciprocating pawl having a finger received in the thread cylinder 26. This method of feeding the strip of self-attaching fasteners may damage the thread cylinder 26, particularly where movement of the strip of fasteners is impeded to the installation head. As will be understood, damage to the thread cylinder may prevent use of the nut following installation. This problem has been solved in a preferred embodiment of this invention by providing grooves or notches in the side wall of the fastener strip either between adjacent fasteners or in the side wall of each nut as shown by notches 54 in FIGS. 1, 2, 9 and 10. As shown in FIG. 10, the strip of self-attaching fasteners may then be fed to the installation head (not shown) by feeders 82 shown in FIG. 10. In this embodiment, the feeders 82 include a rotatable member, wheel or ratchet 84 having a plurality of spaced radial spokes or splines 86 which are received in the grooves or notches 54 in the side walls 42 of the self-attaching fasteners 20. In the preferred embodiment, the spokes 86 are wedge-shaped to guide the spokes 86 into the notches 54. Thus, rotation of the rotatable members 84 in the direction of arrows 88 causes the preoriented strip of fasteners 20 to move in the direction of arrow 90. This feed mechanism and method of feeding the strip of fasteners thus eliminates any contact of the feeder with the thread cylinder 26.

Figure 12:
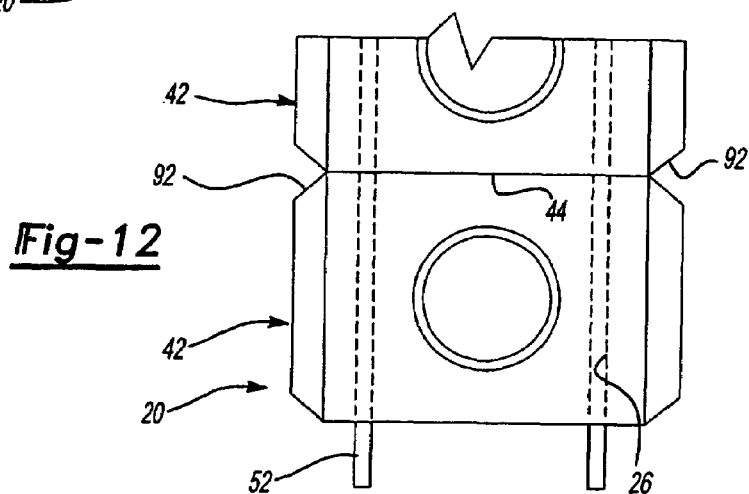
FIG. 12 is a bottom view of an alternative embodiment of the preoriented fastener strip.
Figure 13:
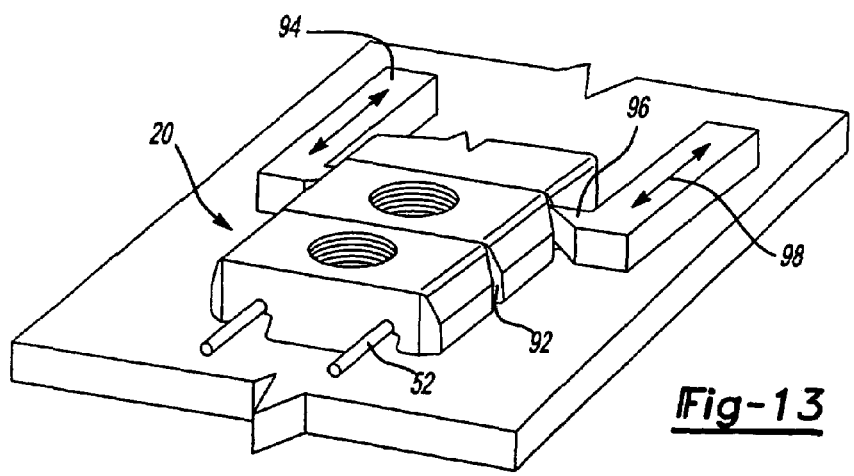
FIG. 13 illustrates a feed mechanism for the fastener strip of FIG. 12.

FIGS. 12 and 13 illustrate an alternative feed mechanism and method of feeding a strip of fasteners, wherein the fasteners each include a chamfer 92 in the side walls adjacent in the end walls 44. The chamfers 92 create notches between the adjacent fasteners 20 as shown in FIGS. 12 and 13. The strip of preoriented fasteners may then be fed to the installation head by rotatable elements 82 shown in FIG. 10 or by reciprocating pawls 94 shown in FIG. 13. The reciprocating pawls 94 each include a wedge-shaped figure 96 which is received in the notches between the nuts defined by the chamfers 92. Upon reciprocation of the pawls 94 as shown by arrow 98, the nut strip is fed linearly. As will be understood by those skilled in this art, the pawl is rotated following each reciprocal movement to release the finger 96 from the notches. The feed pawls 94 may be spring biased (not shown) toward engagement with the notches or chamfered surfaces 92. The reciprocal movement may be provided by actuation of the installation head as disclosed in the prior art.

Figure 14:
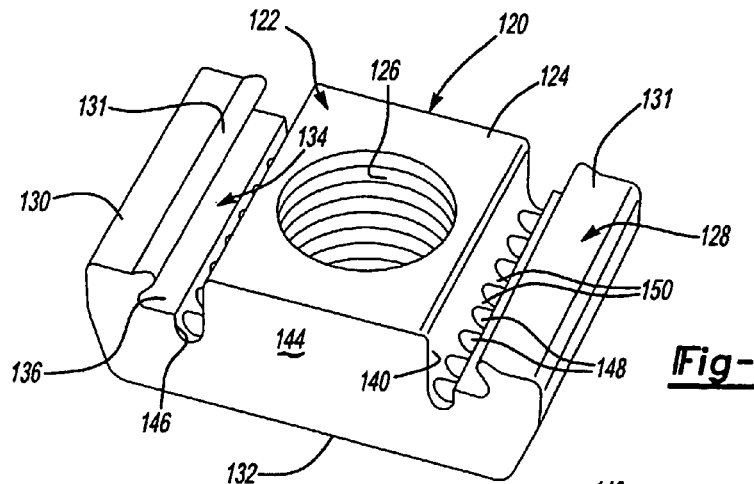
FIG. 14 is a top elevation of an alternative embodiment of a self-attaching fastener.
Figure 15:
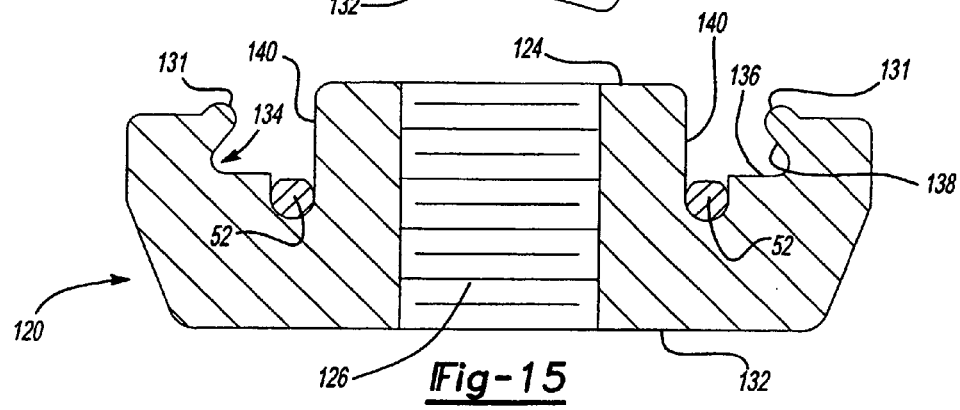
FIG. 15 is a cross-sectional view of the fastener illustrated in FIG. 14 with frangible wires in the wire grooves.
Figure 16:
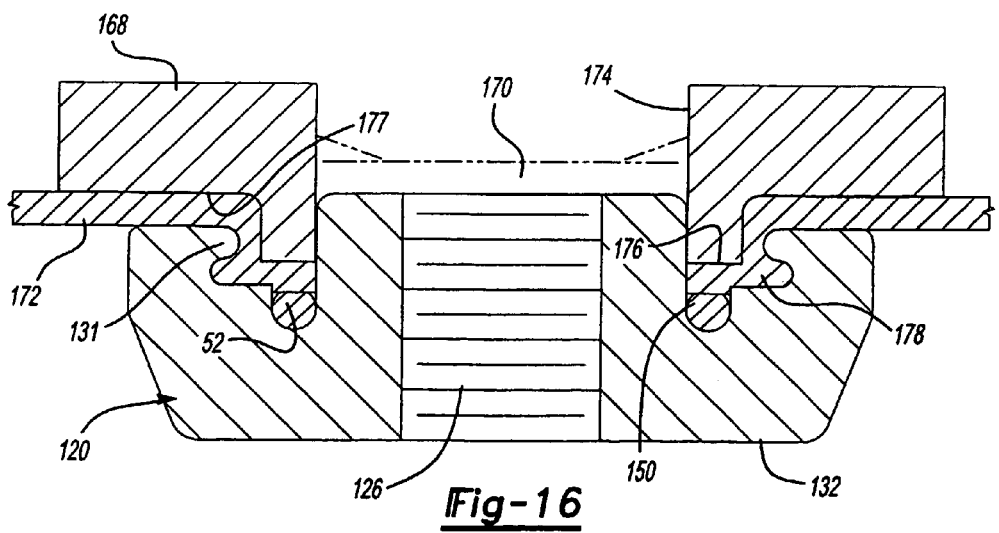
FIG. 16 is a side cross-sectional view of a panel installation of the fastener illustrated in FIGS. 14 and 15.

FIGS. 14 to 16 illustrate an alternative embodiment of the self-attaching fastener system of this invention. The self-attaching fastener 120 shown in FIG. 14 includes a central pilot portion 122 having a top face 124 which serves as a piercing face when the fastener is used as a self-piercing fastener. The fastener includes flange portions 128 on opposed sides of the central pilot portion 122; however, in this embodiment the flange portions 128 also include an upstanding inclined deformable lip portion 131 which partially overlies the bottom wall 136 of the panel receiving grooves 134. Further, the inner wall 140 of the panel receiving grooves extend generally perpendicular to the end face 124 of the pilot portion and the wire receiving grooves 146 are adjacent the pilot portion 122, rather than generally centered in the bottom wall 136. The lower surface of the panel receiving grooves 146 include a plurality of spaced pockets 148 separated by ribs 150 as described above. The remaining features of the self-attaching fastener 120 may be identical to the fastener 20 described above and are therefore numbered in the same sequence. Thus, no further description of the fastener 120 is required.

FIG. 15 illustrates the fastener 120 following receipt of the frangible wires 52 which may be installed in the wire grooves 146 by the method and apparatus described above in regard to FIG. 4. FIG. 16 illustrates one method of installing the fastener system illustrated in FIGS. 14 and 15. As described above in regard to FIG. 8, a self-attaching fastener is conventionally attached to a panel 172 by a die member or die button 168. The die member 168 includes a central opening 174 which receives the panel slug 170 when the self-attaching fastener 120 is utilized as a self-piercing and clinching fastener. Alternatively, the panel includes a pre-pierced or preformed opening configured to receive the pilot portion 122. The die member includes projecting parallel lips 176 which deform the panel portion 178 adjacent the opening in the panel which receives the projecting pilot portion 122 and assists in piercing the panel when the self-attaching fastener 120 is used as a self-piercing fastener. In this embodiment, however, the end face 177 of the die member also deforms the upstanding lips 131 over the panel receiving groove 134, trapping the panel portion 178 in the grooves and providing a secure installation as shown in FIG. 16. In this embodiment, the inner walls 140 of the panel receiving grooves 134 may also be inclined outwardly (not shown) if desired to increase the push-off strength of the fastener and panel assembly.

Figure 17:
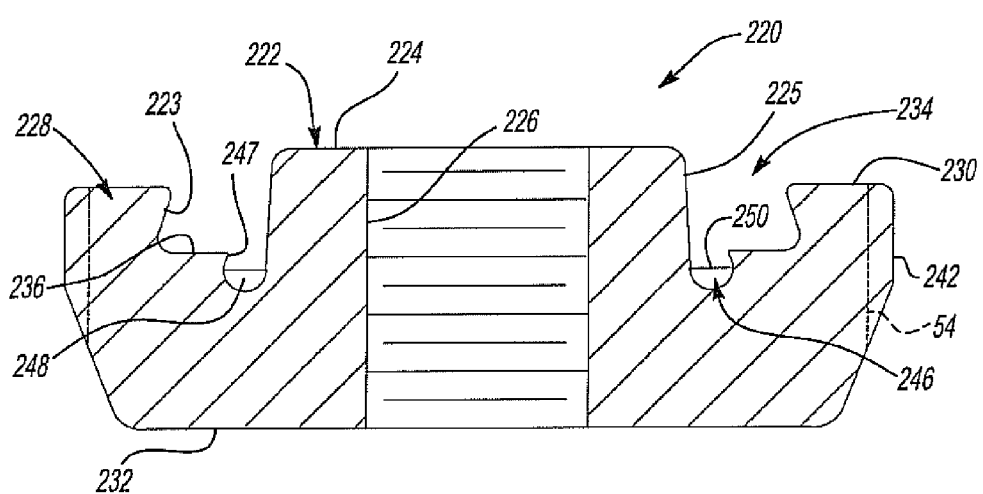
FIG. 17 is a cross-sectional end view of an alternative embodiment of a self-attaching fastener of this invention.

FIG. 17 illustrates a further alternative embodiment of a self-attaching fastener 220 similar to the embodiment of a self-attaching fastener 220 having a central pilot portion 222 including a top face 224, a threaded bore 226 and flange portions 228 on opposed sides of the central pilot portion 222. The pilot portion also includes a threaded bore 226 extending perpendicular to the top face 224 and the outer surface 225 of the pilot portion 222 tapers outwardly to increase the columnar strength of the pilot portion during piercing.

In this embodiment, the inner side wall of the wire grooves 246 is continuous with the outer side wall 223 of the pilot portion and inclined outwardly as shown. The outer side wall 223 of the panel receiving groove 234 is inclined inwardly to define a restricted opening at the bearing faces 230, defining a restricted or re-entrant groove as described above. In this embodiment, the wire grooves 246 are generally tear-shaped having a lip portion 247 partially overlying the bottom surface of the wire grooves improving retention of the wires (not shown) in the wire grooves. During installation of the wire in the wire grooves 246, the lip portion 247 is deformed over the wires improving the retention. The wire grooves also include a plurality of spaced pockets 248, as described above, preventing movement of the fasteners 228 on the wires.

Figure 18:
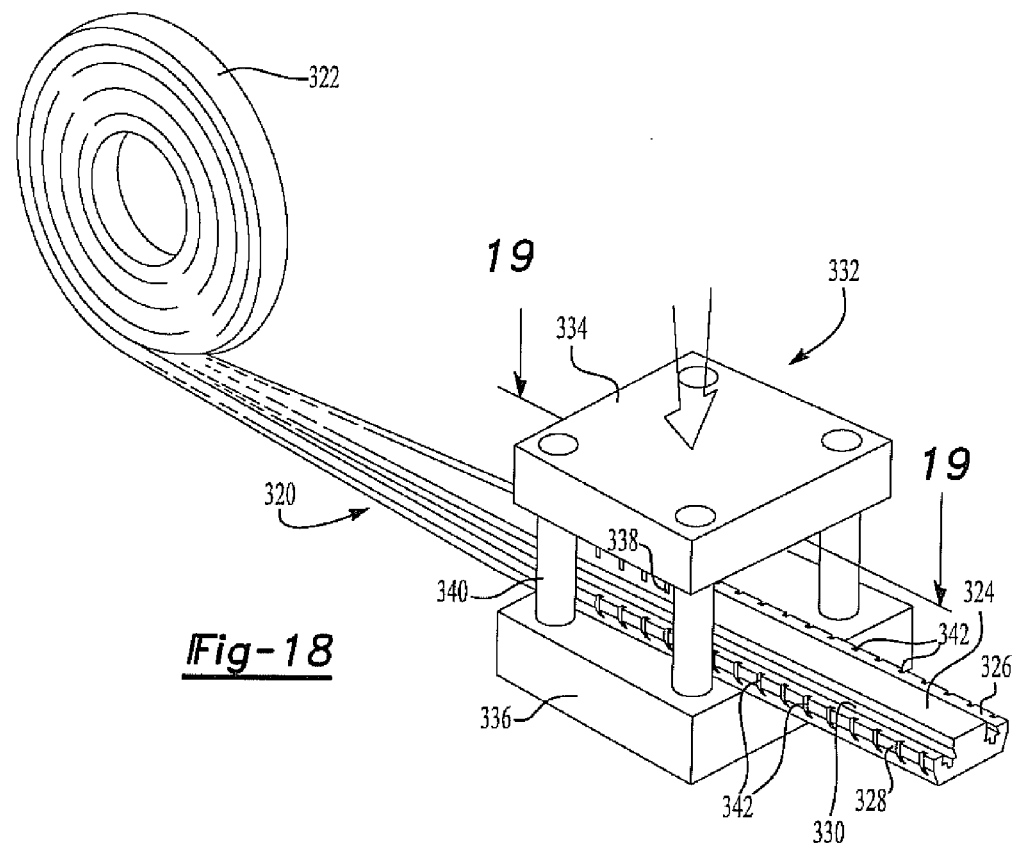
FIG. 18 is a partially schematic side evaluation of a nipping operation forming the grooves in the side walls of the nut strip.

FIGS. 18 to 22 illustrate a preferred method of forming self-attaching fasteners of the types described above which utilizes the notches to improve the quality of the self-attaching fasteners formed. As described above, the cross-section of the self-attaching nut fasteners described above is generally formed in a rolling mill starting with a round metal wire (not shown), which is then rolled in a series of rolling operations to the desired cross-section of the nut. The rolled section or strip 320 is received from the rolling mill by the nut manufacturer in a coil 322 as shown in FIG. 18. As described above, the cross-section of the strip 320 conforms to the desired shape of the self-attaching fasteners and thus the strip 320 includes a continuous central pilot portion 324, flange portions 326 preferably on opposed sides of the pilot portion 324 and the flange portions 326 include side walls 328 and panel receiving grooves 330 as described above. In the prior method of forming self-attaching fasteners of the applicant, the fastener strip is received directly in a piercing or punching station, wherein the nut bores are first formed in the strip and the section is then cut off. The nut bores may then be threaded in a separate tapping station.

In the preferred embodiment of forming self-attaching fasteners of this invention, the fastener strip 320 is first received in a notching or nipping station 332 best shown in FIG. 18. The notching station includes an upper die 334 and an opposed lower die 336, wherein the upper die includes a pair or a plurality of nipping or notching tools 338 and the upper die is conventionally supported on die posts 340. As understood, the die press of the notching station 332 may be a conventional hydraulic or pneumatic press. Thus, upon closing of the die press, the notching tools 338 cut equally spaced notches 342 in the side walls 328 of the strip 320 which are then utilized in the method of this invention to accurately locate the strip in the subsequent punching or piercing and cut-off operations described below. The configuration of the notching tools 338 will depend upon the desired shape of the notches 342. As described above, the notches 342 are preferably U-shaped as described above and shown in FIGS. 1, 9 and 10 or V-shaped as shown in FIGS. 12 and 13.

Figure 19:
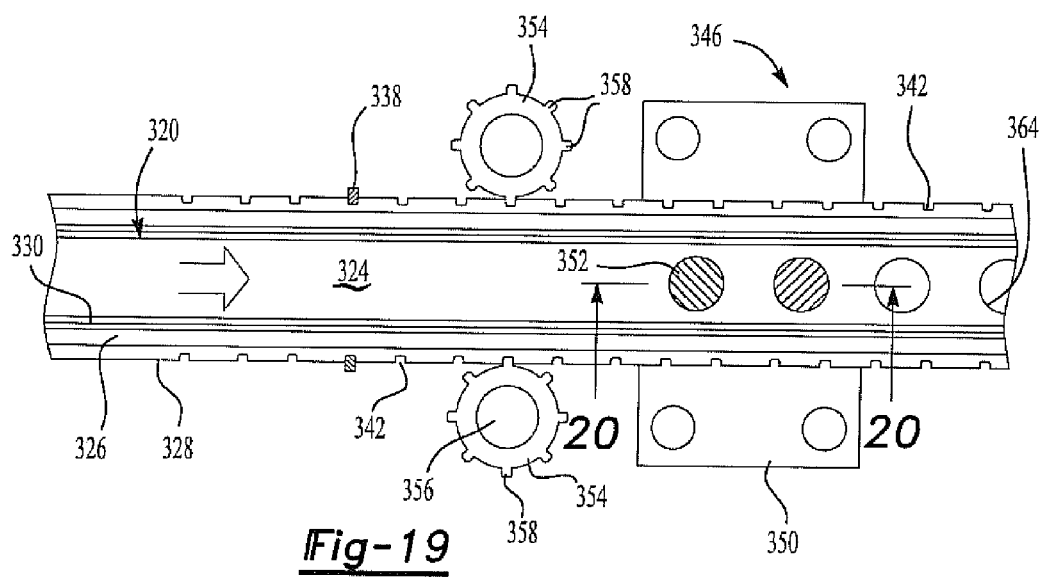
FIG. 19 is a top view of FIG. 18 in the direction of view arrows 19-19 with an additional piercing or punching operation.
Figure 20:
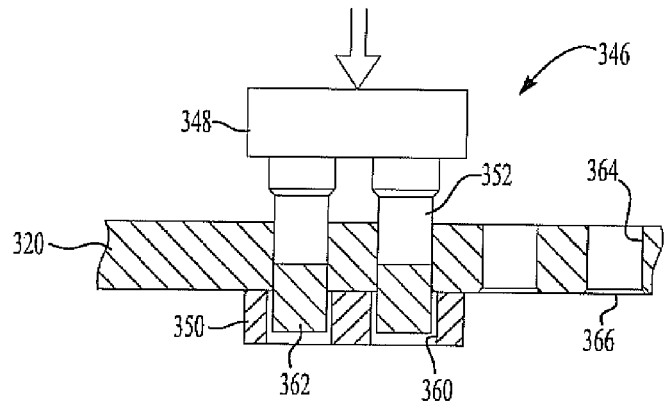
FIG. 20 is a partially cross-sectioned side view of FIG. 19 in the direction of view arrows 20-20.

The strip 320 having equally spaced notches 342 is then transferred to a punching station 346, best shown in FIG. 20, which includes an upper die member or platen 348, a lower die platen 350 and a punch or punches 352 attached to the upper die platen 348. In the method of forming self-attaching fasteners of this invention, the nut strip is transferred to and accurately located in the punching station 346 by rotatable members or wheels 354 supported on drive shafts or posts 356 as shown in FIG. 19. The rotatable members 354 each include a plurality of equally spaced teeth or splines 358 which are received in the notches 342 in the side walls 328 of the strip 320 as shown in FIG. 19. As will be understood, the rotatable members 354 are driven on shafts 356 to both transfer to and accurately locate the strip 320 in the punching station 346. Upon lowering of the upper die 348, the punches 352 punch a slug 362 from the strip 320 and the slugs are then received through appropriate openings 360 in the lower die platen 350. The punches 352 punch or pierce cylindrical openings or bores 364 in the strip 320 as shown in FIG. 20. In the preferred embodiment, the punch is driven through the planar end face of the pilot portion 324 forming a chamfer 366 as shown in FIG. 20 at the bearing face of the section opposite the pilot portion 324.

Figure 21:
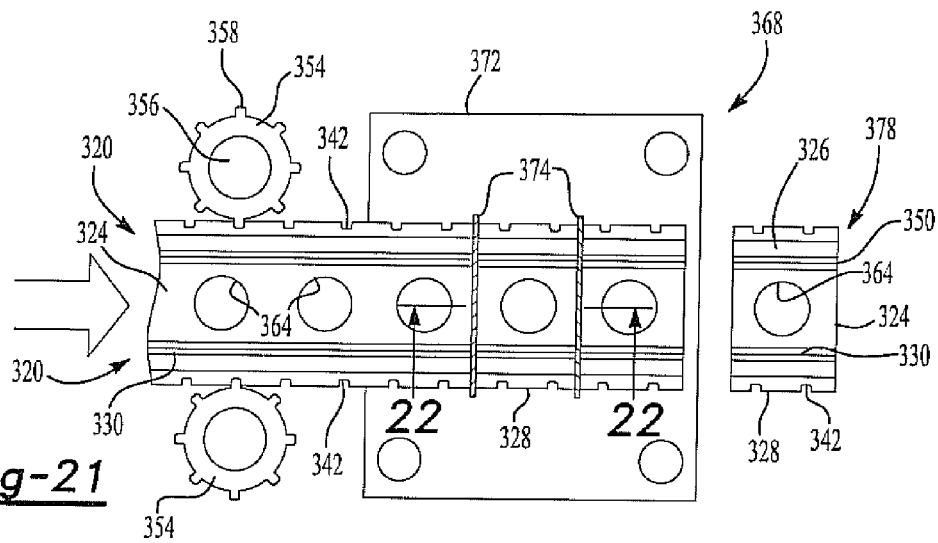
FIG. 21 is a partially schematic top elevation of a cut-off tool.
Figure 22:
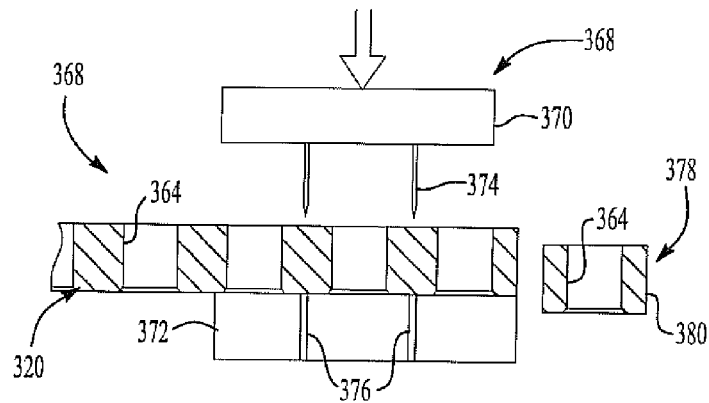
FIG. 22 is a side partially cross-sectioned view of FIG. 21 in the direction of view arrows 22-22.

The nut strip is next received in the cut-off station 368 shown schematically in FIGS. 21 and 22. The cut-off station includes an upper die member 370 and a lower die member 372, wherein the cut-off blades 374 are attached to the upper die member 370 and the lower die member 372 includes openings 376 which receive the cut-off blades 374. The fastener strip 320 is fed through and accurately located in the cut-off station 368 by rotating members 354, as shown in FIG. 21, which may be the same rotating members 354 shown in FIG. 19 or separate indexing and locating members depending upon whether the punching station 346 is in line with the cut-off station 368. As described above, the rotating members 354 are supported on drive shafts 356, each including a plurality of teeth or splines 358 which are received in the notches 342 in the side walls 328 of the strip. Upon closing of the die, the cut-off blades 374 sever the strip into discreet self-attaching fasteners 378 as shown in FIGS. 21 and 22. That is, each of the fasteners 378 include a central pilot portion 328, flange portions 326 on opposed sides of the pilot portion 324, a panel receiving groove 330 in the flange portions 326 and side walls 328 each having equally spaced notches or grooves 342. In the preferred embodiment, the cut-off station 368 is in line with and receives the strip directly from the punching station 346. The rotating members 354 leading to the punching station 346 and the rotating members 354 leading to the cut-off station 368 are either the same rotating members or are indexed together to control the movement and location of the strip 320. As will now be understood, however, the indexing and location of the fastener strip 320 in the punching station 346 and the cut-off station 368 assures that the bore 364 of the self-attaching fasteners 378 is accurately located in the pilot portion 324 between the end walls 380, thereby eliminating the problem associated with the present method of forming self-attaching fasteners described above.

As will now be understood from the above description of the preferred embodiments, various modifications may be made to the self-attaching fasteners, the preoriented fastener strips, method of forming a continuous preoriented strip of fasteners and methods of feeding a preoriented strip of fasteners of this invention. The fasteners may be spaced on the frangible wire connectors as shown in FIG. 9 or the end faces of the fasteners may substantially abut as shown in FIG. 12. The feed mechanisms for a strip of fasteners shown in FIGS. 10, 13, 19 and 21 are considered illustrative only to illustrate feed mechanisms which may be utilized with a fastener strip, wherein the fasteners or the fastener strip include spaced notches or grooves which are utilized to feed and accurately locate the fastener strip without contacting of the thread cylinder. Further, the fastener system of this invention may be utilized with self-attaching fasteners which do not include a panel receiving groove as disclosed in the above-referenced U.S. Pat. No. 3,711,931, wherein the wire grooves would be formed in the bearing surface of the flange portions adjacent the pilot. As set forth above, except for the indexing means including the transfer and locating wheels 354 shown in FIGS. 18 to 22, the notching station 332, punching station 346 and cut-off station 368 are intended to be schematic only. As will be understood by those skilled in this art, the apparatus disclosed schematically are available commercially and thus a detailed description of these apparatus is not required. However, various modifications may be made to the method of forming self-attaching fasteners disclosed in FIGS. 18 to 22 within the purview of the appended claims. For example, the notches 342 may be V-shaped as shown in FIGS. 12 and 13, wherein the cut-off blades 374 are then aligned with the apex of the V-shaped notches or grooves forming the self-attaching fasteners shown in FIGS. 12 and 13. Further, the methods of this invention may be used to form an integral strip of fasteners wherein only the pilot portion is severed from the strip providing frangible connector portions on opposed sides of the strip. Further, as set forth above, the preferred embodiments of the self-attaching fasteners include equally spaced notches or grooves in at least one of the side walls of the fasteners as described above. However, protrusions can also be formed in the side walls in the rolling process, for example, which provide abutment surfaces for forming self-attaching fasteners and feeding a strip of fasteners as described above.

The invention claimed is:

1. A self-attaching fastener, comprising:
a central projecting pilot portion having an end face and opposed sides, a bore extending through said pilot portion through said end face, a flange portion on each opposed side of said pilot portion, each flange portion having a panel supporting face, each panel supporting face each flange portion including panel receiving grooves said panel receiving grooves each including a bottom wall and opposed side walls including an inner side wall adjacent said pilot portion and an outer side wall, at least one of said side walls of said panel receiving grooves being inclined relative to said bottom wall and overlying said bottom wall, and said outer side wall including a deformable lip inclined upwardly from said panel support faces and overlying said bottom wall.

2. The self-attaching fastener as defined in claim 1, wherein said bottom wall of each of said panel receiving grooves includes a wire retaining groove.

3. The self-attaching fastener as defined in claim 2 wherein said wire retaining grooves include spaced pockets and said wire retaining grooves each includes a frangible wire deformed into said spaced pockets in said bottom wall of said wire retaining groove.

4. The self-attaching fastener as defined in claim 1, wherein said outer side wall of said panel receiving grooves is inclined toward said pilot portion.

\* \* \* \* \*